United States Patent
Nakano et al.

(10) Patent No.: US 11,798,742 B2
(45) Date of Patent: Oct. 24, 2023

(54) MOUNTING STRUCTURE OF A MULTILAYER CERAMIC CAPACITOR

(71) Applicant: Murata Manufacturing Co., Ltd., Nagaokakyo (JP)

(72) Inventors: Suguru Nakano, Nagaokakyo (JP); Satoshi Muramatsu, Nagaokakyo (JP); Risa Hojo, Nagaokakyo (JP); Yoshiyuki Nomura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/092,496

(22) Filed: Jan. 3, 2023

(65) Prior Publication Data

US 2023/0133747 A1 May 4, 2023

Related U.S. Application Data (63) Continuation of application No. 17/118,667, filed on Dec. 11, 2020, now Pat. No. 11,600,440.

(30) Foreign Application Priority Data

Dec. 12, 2019 (JP) .................................. 2019-224654

(51) Int. Cl.
| | |
|---|---|
| *H01G 4/12* | (2006.01) |
| *H01G 4/30* | (2006.01) |
| *H01G 4/008* | (2006.01) |
| *H01G 4/012* | (2006.01) |

(52) U.S. Cl.
CPC .............. *H01G 4/12* (2013.01); *H01G 4/008* (2013.01); *H01G 4/012* (2013.01); *H01G 4/30* (2013.01)

(58) Field of Classification Search
CPC .......... H01G 4/008; H01G 4/012; H01G 4/12; H01G 4/30
See application file for complete search history.

(56) References Cited

U.S. PATENT DOCUMENTS

| | | | |
|---|---|---|---|
| 6,370,010 B1 * | 4/2002 | Kuroda | H01G 4/30 361/308.1 |
| 2021/0233710 A1 * | 7/2021 | Kim | H01G 4/232 |

OTHER PUBLICATIONS

Nakano et al., "Multilayer Ceramic Capacitor", U.S. Appl. No. 17/118,667, filed Dec. 11, 2020.

* cited by examiner

Primary Examiner — Nathan Milakovich
(74) Attorney, Agent, or Firm — KEATING & BENNETT, LLP (57) ABSTRACT

A mounting structure of a multilayer ceramic capacitor includes a substrate, and a multilayer ceramic capacitor connected to the substrate and including a laminate including dielectric layers and internal electrode layers, and external electrodes on main surfaces of the laminate. The laminate further includes first, second, third, and fourth via conductors connecting the internal electrode layers and the external electrodes. The external electrodes include first, second, third, and fourth external electrodes, each connected to respective end surfaces of the via conductor. Each of the external electrodes does not extend to the side surfaces of the laminate. A ratio W/L of a dimension W in the width direction of the multilayer ceramic capacitor to a dimension L in the length direction of the multilayer ceramic capacitor is about 0.85 or more and about 1 or less.

12 Claims, 8 Drawing Sheets

FIG.13
COMPARATIVE EXAMPLE

MOUNTING STRUCTURE OF A MULTILAYER CERAMIC CAPACITOR

CROSS REFERENCE TO RELATED APPLICATIONS

This application claims the benefit of priority to Japanese Patent Application No. 2019-224654 filed on Dec. 12, 2019. The entire contents of this application are hereby incorporated herein by reference.

BACKGROUND OF THE INVENTION

1. Field of the Invention

The present invention relates to a mounting structure of a multilayer ceramic capacitor.

2. Description of the Related Art

Electronic devices such as mobile phones and portable music players have been reduced in size and thickness. Electronic devices include many multilayer ceramic electronic components such as multilayer ceramic capacitors. These multilayer ceramic electronic components, which are embedded in a substrate or mounted on a substrate surface, have also been reduced in size and thickness along with the reduction in size of electronic devices. Such reduction in thickness of multilayer ceramic electronic components has led to difficulty in providing sufficient strength to the multilayer ceramic electronic components.

JP 2011-54864 A discloses a capacitor mounting structure including an integrated circuit (IC), a circuit board, and a three-terminal capacitor. The three-terminal capacitor in the capacitor mounting structure disclosed in JP 2011-54864 A includes, in a substantially square chip in a plan view, a signal electrode and a ground electrode that are orthogonal to each other in a plan view, oppose each other in the thickness direction, and have the same length. The first and second external electrodes are electrically connected to the respective ends of the signal electrode and the third and fourth external electrodes are electrically connected to the respective ends of the ground electrode.

The further reduction in size and thickness of electronic devices in recent years has led to the demand for further reduction in thickness of multilayer ceramic capacitors. The reduction in thickness, however, unfortunately involves a decrease in flexural strength of the multilayer ceramic capacitors.

Also, conventionally, electronic components such as multilayer ceramic capacitors are mounted on a substrate by applying a solder paste containing a conductive material to the lands on the substrate, mounting the electronic components, and reflowing the solder paste. This establishes electrical connection between the substrate and the electronic components.

The structure disclosed in JP 2011-54864 A, however, includes external electrodes on the side surfaces of the multilayer ceramic capacitor, problematically leading to a large mounting thickness in solder mounting.

Meanwhile, there is a method called flux mounting which mounts electronic components other than multilayer ceramic capacitors on a substrate. In this method, electronic components are mounted on a substrate using a thermosetting resin flux containing no conductive material, instead of a solder paste containing a conductive material. This method uses the melt of external electrodes defining the electronic components to connect the lands to the external electrodes and thereby establish electrical connection therebetween through a reflow process. The flux itself contributes to removal of oxides on the land surfaces and external electrodes owing to its organic acid and contributes to enhancement of the adhesion between the electronic components and the lands.

Flux mounting using a thermosetting resin flux containing no conductive material is expected to achieve better effects of decreasing the mounting thickness and increasing the thermal shock resistance than solder mounting using a solder paste containing a conductive material.

SUMMARY OF THE INVENTION

Preferred embodiments of the present invention provide mounting structures of multilayer ceramic capacitors each with high flexural strength and reduced mounting thicknesses.

A mounting structure of a multilayer ceramic capacitor according to a preferred embodiment of the present invention includes a substrate and a multilayer ceramic capacitor connected to the substrate via a bonding material. The multilayer ceramic capacitor includes a laminate including a plurality of dielectric layers and a plurality of internal electrode layers laminated together, the laminate including a first main surface and a second main surface that oppose each other in a lamination direction, a first side surface and a second side surface that oppose each other in a length direction perpendicular or substantially perpendicular to the lamination direction, and a third side surface and a fourth side surface that oppose each other in a width direction perpendicular or substantially perpendicular to the lamination direction and the length direction, and external electrodes that are on the main surfaces of the laminate and electrically connected to the internal electrode layers. The laminate further includes a first via conductor, a second via conductor, a third via conductor, and a fourth via conductor that connect the internal electrode layers and the external electrodes. Each of the via conductors penetrates the laminate in the lamination direction and has a first end surface exposed on the first main surface of the laminate and a second end surface exposed on the second main surface of the laminate. The external electrodes include a pair of first external electrodes connected to the respective end surfaces of the first via conductor, a pair of second external electrodes connected to the respective end surfaces of the second via conductor, a pair of third external electrodes connected to the respective end surfaces of the third via conductor, and a pair of fourth external electrodes connected to the respective end surfaces of the fourth via conductor. Each of the external electrodes does not extend to the side surfaces of the laminate. A ratio W/L of a dimension W in the width direction of the multilayer ceramic capacitor to a dimension L in the length direction of the multilayer ceramic capacitor is about 0.85 or more and about 1 or less.

The preferred embodiments of the present invention provide mounting structures of multilayer ceramic capacitors each with high flexural strength and reduced mounting thicknesses.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic capacitors according to preferred embodiments of the present invention are described.

The present invention is not limited to the following preferred embodiments, and may be suitably modified without departing from the gist of the present invention. Combinations of two or more preferred features described in the following preferred embodiments are also within the scope of the present invention.

Figure 1:
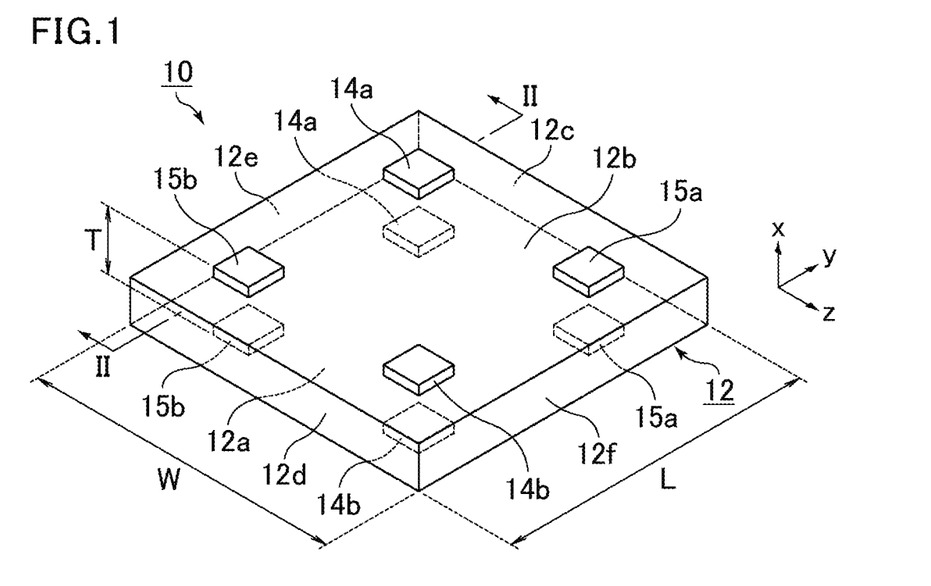
FIG. 1 is a perspective view showing an example multilayer ceramic capacitor according to a preferred embodiment of the present invention.
Figure 2:
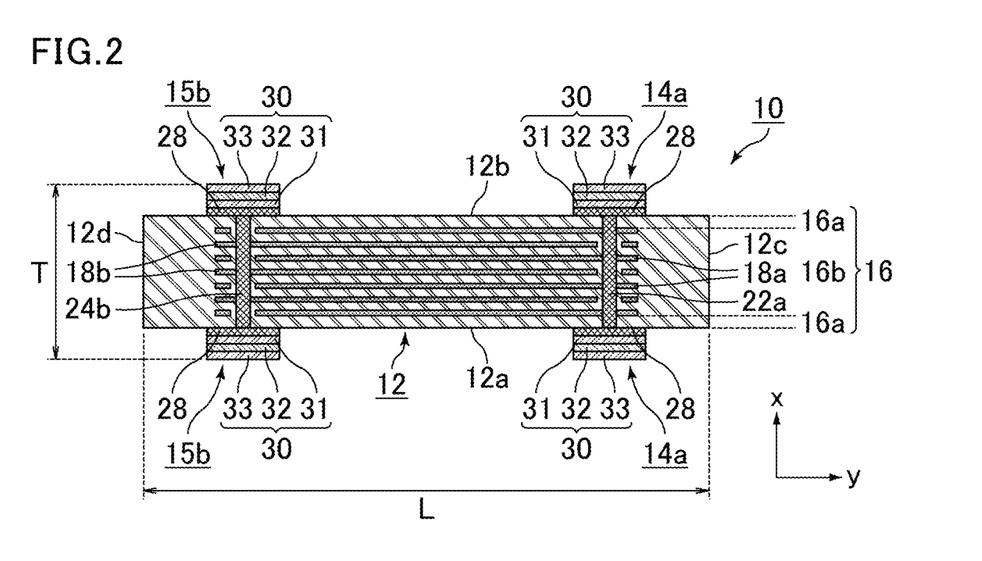
FIG. 2 is a cross-sectional view taken along the line II-II of the multilayer ceramic capacitor shown in FIG. 1.
Figure 3:
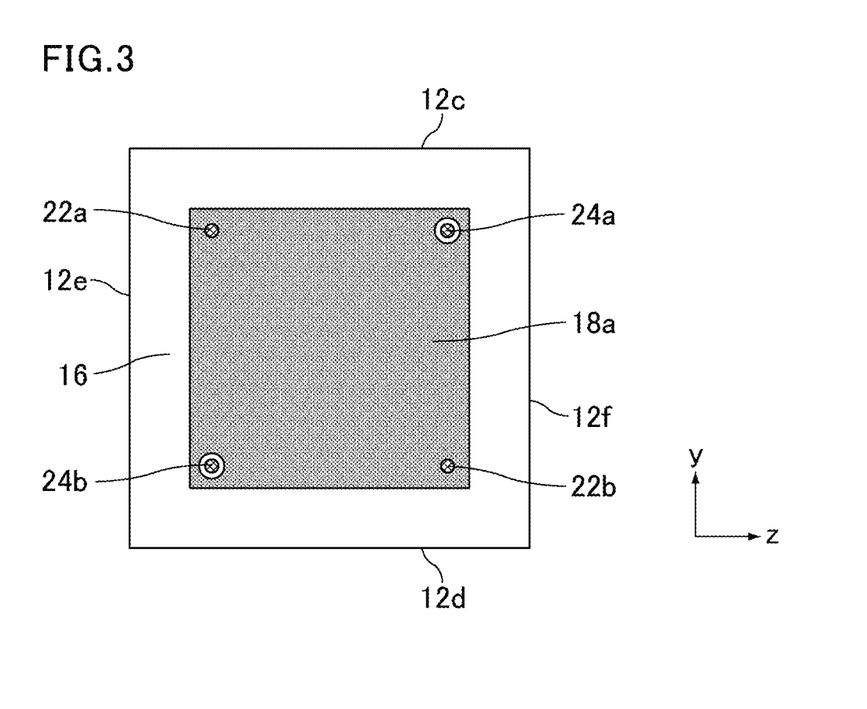
FIG. 3 is a plan view of a cross section including a first internal electrode layer defining the multilayer ceramic capacitor shown in FIG. 1 as viewed in the lamination direction.
Figure 4:
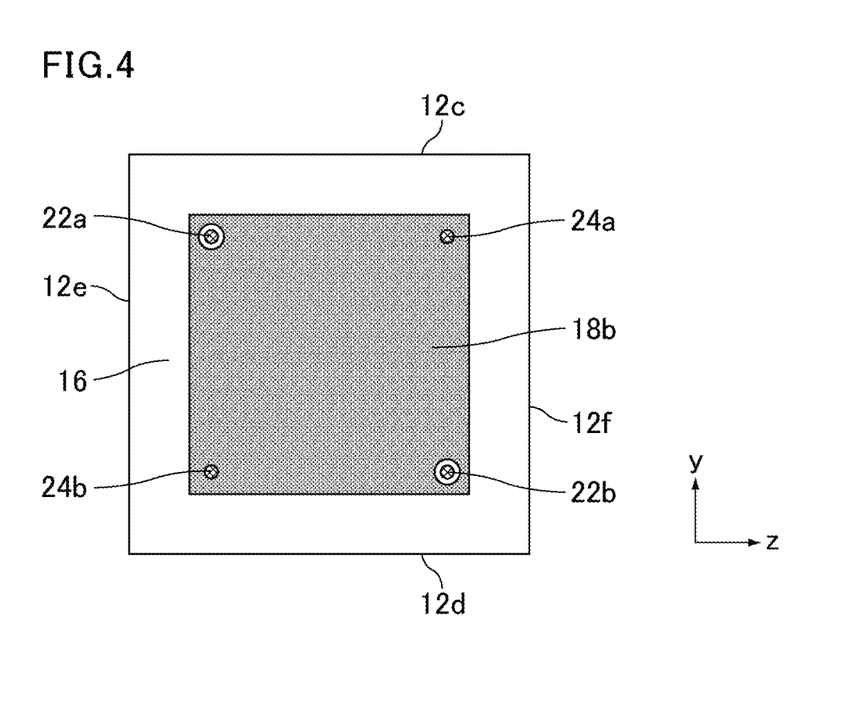
FIG. 4 is a plan view of a cross section including a second internal electrode layer defining the multilayer ceramic capacitor shown in FIG. 1 as viewed in the lamination direction.
Figure 5:
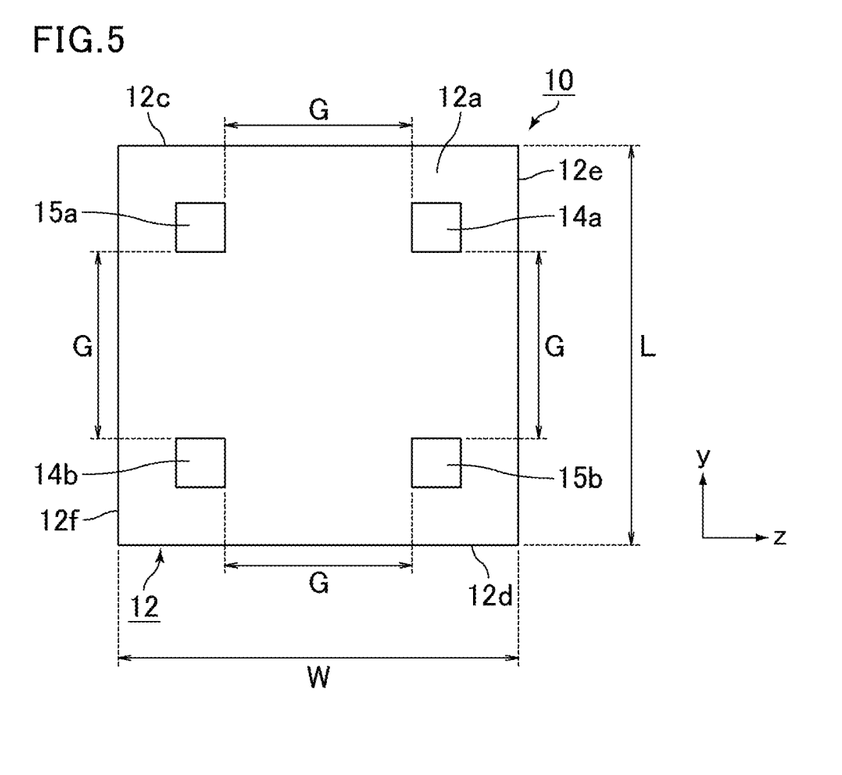
FIG. 5 is a plan view of the multilayer ceramic capacitor shown in FIG. 1 as viewed from a first main surface.
Figure 6:
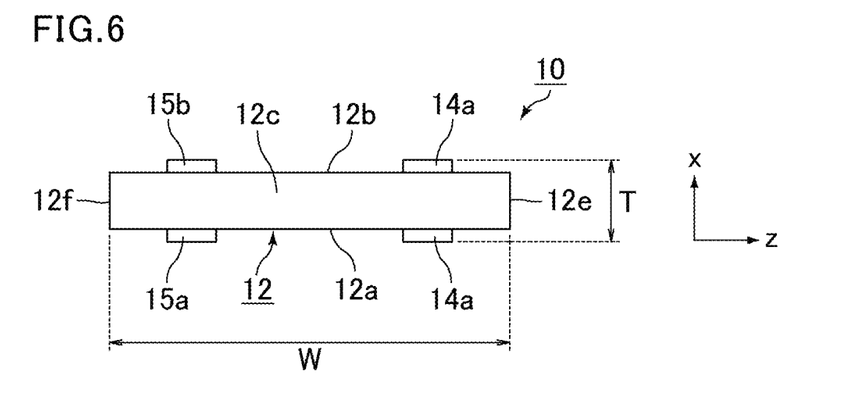
FIG. 6 is a side view of the multilayer ceramic capacitor shown in FIG. 1 as viewed from a first side surface.

FIG. 1 is a perspective view showing an example multilayer ceramic capacitor according to a preferred embodiment of the present invention. FIG. 2 is a cross-sectional view taken along the line II-II of the multilayer ceramic capacitor shown in FIG. 1. FIG. 3 is a plan view of a cross section including a first internal electrode layer defining the multilayer ceramic capacitor shown in FIG. 1 as viewed in the lamination direction. FIG. 4 is a plan view of a cross section including a second internal electrode layer defining the multilayer ceramic capacitor shown in FIG. 1 as viewed in the lamination direction. FIG. 5 is a plan view of the multilayer ceramic capacitor shown in FIG. 1 as viewed from a first main surface. FIG. 6 is a side view of the multilayer ceramic capacitor shown in FIG. 1 as viewed from a first side surface.

A multilayer ceramic capacitor 10 shown in FIG. 1 includes a laminate 12, which is a rectangular cuboid or a substantially rectangular cuboid, first external electrodes 14a, second external electrodes 14b, third external electrodes 15a, and fourth external electrodes 15b.

The laminate 12 has a first main surface 12a and a second main surface 12b that oppose each other in a lamination direction x, a first side surface 12c and a second side surface 12d that oppose each other in a length direction y perpendicular or substantially perpendicular to the lamination direction x, and a third side surface 12e and a fourth side surface 12f that oppose each other in a width direction z perpendicular or substantially perpendicular to the lamination direction x and the length direction y. The first main surface 12a and the second main surface 12b each extend in the length direction y and the width direction z. The first side surface 12c and the second side surface 12d each extend in the lamination direction x and the width direction z. The third side surface 12e and the fourth side surface 12f each extend in the lamination direction x and the length direction y.

Herein, a surface of the multilayer ceramic capacitor 10 or the laminate 12 extending in the length direction y and the lamination direction x is referred to as an LT surface. A surface extending in the length direction y and the width direction z is referred to as an LW surface. A surface extending in the lamination direction x and the width direction z is referred to as a WT surface.

When the multilayer ceramic capacitor 10 shown in FIG. 1 is mounted on a substrate, the first main surface 12a of the laminate 12 is the mounting surface and the second main surface 12b of the laminate 12 is the counter surface.

Preferably, for example, corners and ridges of the laminate 12 are rounded. The corner is a portion where three surfaces of the laminate 12 meet, and the ridge is a portion where two surfaces of the laminate 12 meet.

As shown in FIG. 2, the laminate 12 includes a plurality of dielectric layers 16, a plurality of first internal electrode layers 18a, and a plurality of second internal electrode layers 18b laminated in the lamination direction x.

The dielectric layers 16 include outer layer portions 16a and an effective layer portion 16b. The outer layer portions 16a are located closer to the first main surface 12a and the second main surface 12b of the laminate 12. Specifically, they correspond to the dielectric layer(s) 16 between the first main surface 12a and the internal electrode layer closest to the first main surface 12a (a first internal electrode layer 18a in FIG. 2) and the dielectric layer(s) 16 between the second main surface 12b and the internal electrode layer closest to the second main surface 12b (a first internal electrode layer 18a in FIG. 2). For example, one of the outer layer portions 16a preferably has a thickness of about 3 μm or greater and about 15 μm or smaller, more preferably about 3 μm or greater and about 13 μm or smaller, still more preferably about 3 μm or greater and about 9 μm or smaller. The region sandwiched by the outer layer portions 16a is the effective layer portion 16b. In other words, the effective layer portion 16b is the region where the first internal electrode layers 18a and the second internal electrode layers 18b are laminated.

The dielectric layers 16 may include a dielectric material, for example. The dielectric material may be a dielectric ceramic including barium titanate, calcium titanate, strontium titanate, barium calcium titanate, or calcium zirconate as the main component, for example. When including the dielectric material as a main component, the dielectric layers 16 may include, for example, an accessory component such as a Mg compound, a Mn compound, a Si compound, an Al compound, a V compound, a Ni compound, or a rare earth compound, in an amount less than the amount of the main component, depending on predetermined characteristics of the multilayer ceramic capacitor 10.

The average thickness of the dielectric layers 16 each sandwiched by a first internal electrode layer 18a and a second internal electrode layer 18b is preferably about 0.4 μm or greater and about 1.0 μm or smaller, more preferably about 0.4 μm or greater and about 0.8 μm or smaller, still more preferably about 0.4 μm or greater and about 0.6 μm or smaller, for example.

In the laminate 12, the first internal electrode layers 18a and the second internal electrode layers 18b are alternately laminated with a dielectric layer 16 in between.

Each first internal electrode layer 18a is on a surface of a dielectric layer 16. As shown in FIG. 3, the first internal electrode layer 18a is not exposed on the first side surface 12c, the second side surface 12d, the third side surface 12e, or the fourth side surface 12f of the laminate 12.

Each second internal electrode layer 18b is on a surface of a dielectric layer 16 different from dielectric layers 16 on which a first internal electrode layer 18a is provided. As shown in FIG. 4, the second internal electrode layer 18b is not exposed on the first side surface 12c, the second side surface 12d, the third side surface 12e, or the fourth side surface 12f of the laminate 12.

The first internal electrode layers 18a and the second internal electrode layers 18b may include, for example, a metal such as Ni, Cu, Ag, Pd, or Au, or an alloy including at least one of these metals, such as an Ag—Pd alloy. The first internal electrode layers 18a and the second internal electrode layers 18b may further include dielectric particles with the same or similar composition as the ceramic included in the dielectric layers 16. The total number of the first internal electrode layers 18a and the second internal electrode layers 18b laminated is preferably about 10 or more and about 80 or less, for example. The average thickness of the first internal electrode layers 18a and the average thickness of the second internal electrode layers 18b are each preferably about 0.3 µm or greater and about 1.0 µm or smaller, more preferably about 0.6 µm or greater and about 1.0 µm or smaller, for example.

As shown in FIG. 2, FIG. 3, and FIG. 4, the laminate 12 further includes a first via conductor 22a, a second via conductor 22b, a third via conductor 24a, and a fourth via conductor 24b.

The first via conductor 22a, the second via conductor 22b, the third via conductor 24a, and the fourth via conductor 24b each penetrate the laminate 12 in the lamination direction x and have a first end surface exposed on the first main surface 12a of the laminate 12 and a second end surface exposed on the second main surface 12b of the laminate 12.

The first via conductor 22a penetrates each of the first internal electrode layers 18a and electrically connects these first internal electrode layers 18a to each other. Similarly, the second via conductor 22b penetrates each of the first internal electrode layers 18a and electrically connects these first internal electrode layers 18a to each other.

The third via conductor 24a penetrates each of the second internal electrode layers 18b and electrically connects these second internal electrode layers 18b to each other. Similarly, the fourth via conductor 24b penetrates each of the second internal electrode layers 18b and electrically connects these second internal electrode layers 18b to each other.

The first via conductor 22a, the second via conductor 22b, the third via conductor 24a, and the fourth via conductor 24b may include, for example, a metal such as Ni, Cu, Ag, Pd, or Au, or an alloy including at least one of these metals, such as an Ag—Pd alloy. The first via conductor 22a, the second via conductor 22b, the third via conductor 24a, and the fourth via conductor 24b may further include dielectric particles with the same or similar composition as the ceramic included in the dielectric layers 16. The material of the first via conductor 22a, the second via conductor 22b, the third via conductor 24a, and the fourth via conductor 24b may be the same as or different from the material of the first internal electrode layers 18a and the second internal electrode layers 18b.

The diameter of each of the first via conductor 22a, the second via conductor 22b, the third via conductor 24a, and the fourth via conductor 24b is preferably about 30 µm or greater and about 150 µm or smaller, for example.

The first main surface 12a and second main surface 12b of the laminate 12 are provided with a pair of first external electrodes 14a, a pair of second external electrodes 14b, a pair of third external electrodes 15a, and a pair of fourth external electrodes 15b. In the multilayer ceramic capacitor 10, the external electrodes are defined by the four pairs of external electrodes, namely the pair of first external electrodes 14a, the pair of second external electrodes 14b, the pair of third external electrodes 15a, and the pair of fourth external electrodes 15b.

The first external electrodes 14a are connected to the respective end surfaces of the first via conductor 22a. Thus, the first external electrodes 14a are electrically connected to the first internal electrode layers 18a.

The second external electrodes 14b are connected to the respective end surfaces of the second via conductor 22b. Thus, the second external electrodes 14b are electrically connected to the first internal electrode layers 18a.

The third external electrodes 15a are connected to the respective end surfaces of the third via conductor 24a. Thus, the third external electrodes 15a are electrically connected to the second internal electrode layers 18b.

The fourth external electrodes 15b are connected to the respective end surfaces of the fourth via conductor 24b. Thus, the fourth external electrodes 15b are electrically connected to the second internal electrode layers 18b.

In the laminate 12, the first internal electrode layers 18a and the second internal electrode layers 18b oppose each other with a dielectric layer 16 in between, and the electrical characteristics (e.g., capacitance) are generated. This produces capacitance between the first external electrode 14a and the second external electrode 14b electrically connected to the first internal electrode layers 18a and the third external electrode 15a and the fourth external electrode 15b electrically connected to the second internal electrode layers 18b. The multilayer ceramic capacitor 10 thereby defines and functions as a capacitor.

In the multilayer ceramic capacitor 10, each of the external electrodes 14a, 14b, 15a, and 15b does not extend to the side surfaces of the laminate 12. Accordingly, a reduced mounting thickness is able to be provided.

The ratio W/L of the dimension W in the width direction z of the multilayer ceramic capacitor 10 to the dimension L in the length direction y of the multilayer ceramic capacitor 10 is about 0.85 or more and about 1 or less. The dimension L in the length direction y of the multilayer ceramic capacitor 10 is about 750 µm or smaller. The dimension ratio W/L and the dimension L falling within the above respective ranges are able to provide a high flexural strength.

The dimension L in the length direction y of the multilayer ceramic capacitor 10 is preferably about 400 µm or greater, for example.

The dimension T in the lamination direction x of the multilayer ceramic capacitor 10 is preferably about 50 µm or greater and about 110 µm or smaller, for example. Accordingly, a reduced mounting thickness is able to be provided in the above range of the dimension T in which the strength of the multilayer ceramic capacitor is difficult to provide.

The dimension T includes the laminate and the external electrodes.

As shown in FIG. 5, the distance G between adjacent external electrodes on the first main surface 12a of the laminate 12 is preferably about 100 µm or greater, for example. Accordingly, generation of migration when the capacitor is mounted on a substrate is able to be reduced or prevented.

The distance G between adjacent external electrodes is preferably about 600 μm or smaller, for example. The distance G between the first external electrode 14a and the third external electrode 15a, the distance G between the first external electrode 14a and the fourth external electrode 15b, the distance G between the second external electrode 14b and the third external electrode 15a, and the distance G between the second external electrode 14b and the fourth external electrode 15b may be the same as or different from each other.

The flatness of the mounting surface of the laminate 12 is preferably about 31 or more, for example. Accordingly, generation of connection failure not only in solder mounting but also in flux mounting is able to be reduced or prevented.

The flatness of the mounting surface of the laminate 12 is determined as a proportion of the total area of the regions of the external electrodes 14a, 14b, 15a, and 15b within about 5 μm from the highest point on all of the external electrodes 14a, 14b, 15a, and 15b to the total area of the external electrodes 14a, 14b, 15a, and 15b. Specifically, the laminate 12 is placed on a measuring table with the mounting surface (the first main surface 12a in FIG. 1) faced down, and the regions of the external electrodes 14a, 14b, 15a, and 15b within about 5 μm from the highest point, relative to the measuring table, on all of the external electrodes 14a, 14b, 15a, and 15b on the counter surface (the second main surface 12b in FIG. 1) opposing the mounting surface, are extracted. The heights are measured with a laser displacement meter. The flatness of the mounting surface of the laminate 12 is calculated from the following equation:

Flatness=100×total area of regions up to height of about 5 μm from highest points of external electrodes/total area of external electrodes (4 terminals)

The flatness of the mounting surface of the laminate 12 is preferably about 100 or less, for example. Also, the preferred range of the flatness of the counter surface of the laminate 12 is the same or substantially the same as the preferred range of the flatness of the mounting surface of the laminate 12.

Figure 7:
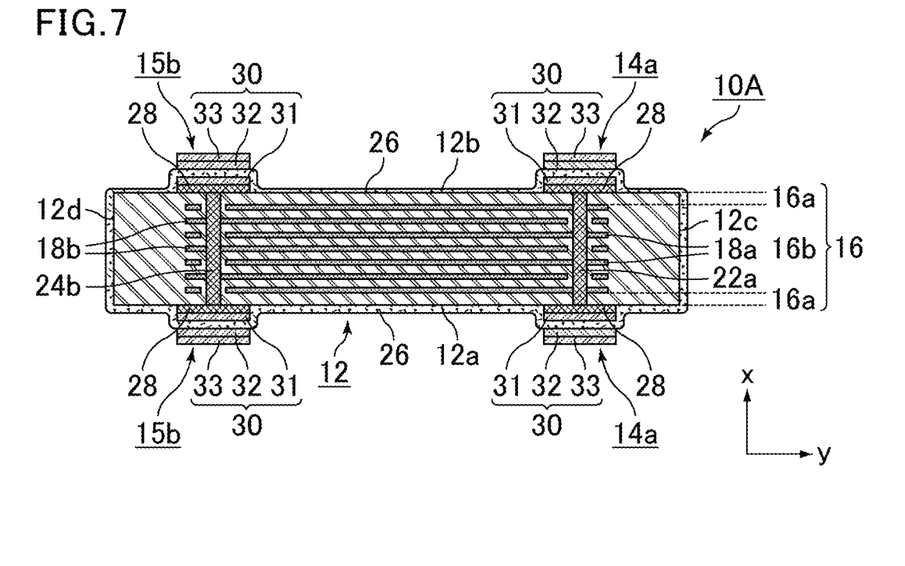
FIG. 7 is a cross-sectional view showing another example multilayer ceramic capacitor according to a preferred embodiment of the present invention.

FIG. 7 is a cross-sectional view showing another example multilayer ceramic capacitor according to a preferred embodiment of the present invention.

In a multilayer ceramic capacitor 10A shown in FIG. 7, a silane coupling agent layer 26 is on the first main surface 12a, which is the mounting surface, among the surfaces of the laminate 12. The silane coupling agent layer 26 is preferably, for example, on the entire or a portion of the first main surface 12a without the first external electrode 14a, the second external electrode 14b, the third external electrode 15a, and the fourth external electrode 15b.

In the multilayer ceramic capacitor 10A, the silane coupling agent layer 26 may be on at least the mounting surface among the surfaces of the laminate 12. The silane coupling agent layer 26 may be on the counter surface among the surfaces of the laminate 12. In other words, the silane coupling agent layer 26 may be on the second main surface 12b as well as the first main surface 12a. In this case, the silane coupling agent layer 26 is preferably, for example, on the entire or a portion of the second main surface 12b without the first external electrode 14a, the second external electrode 14b, the third external electrode 15a, and the fourth external electrode 15b.

Moreover, in the multilayer ceramic capacitor 10A, the silane coupling agent layer 26 may be on a surface other than the mounting surface and counter surface among the surfaces of the laminate 12. In other words, the silane coupling agent layer 26 may be on the first side surface 12c, the second side surface 12d, the third side surface 12e, and the fourth side surface 12f as well as the first main surface 12a and the second main surface 12b. In this case, the silane coupling agent layer 26 is preferably, for example, on the entire or a portion of the first side surface 12c, the second side surface 12d, the third side surface 12e, and the fourth side surface 12f without the first external electrode 14a, the second external electrode 14b, the third external electrode 15a, and the fourth external electrode 15b.

The first external electrode 14a, the second external electrode 14b, the third external electrode 15a, and the fourth external electrode 15b each preferably include a base electrode layer 28 and a plating layer 30 sequentially from the laminate 12 side, for example.

The base electrode layer 28 is preferably a baked electrode layer, for example. The baked electrode layer includes glass and metal. The metal of the baked electrode layer includes at least one selected from Cu, Ni, Ag, Pd, an Ag—Pd alloy, Au, and the like. The baked electrode layer may be a multilayer. The baked electrode layer is formed by applying a conductive paste including glass and metal to the laminate 12 and baking the paste. The baked electrode layer may be simultaneously fired with the dielectric layers 16, the first internal electrode layers 18a, and the second internal electrode layers 18b, or may be baked after the dielectric layers 16, the first internal electrode layers 18a, and the second internal electrode layers 18b are fired. The thickness of the baked electrode layer is preferably about 1 μm or greater and about 6 μm or smaller, for example.

The plating layer 30 includes, for example, at least one selected from Ni, Sn, Cu, Ag, Pd, an Ag—Pd alloy, Au, and the like. The plating layer 30 may be a multilayer.

In the examples shown in FIG. 2 and FIG. 7, the plating layer 30 includes a Cu plating layer 31, a Ni plating layer 32, and a Sn plating layer 33 sequentially from the base electrode layer 28 side. As shown in FIG. 7, in the case where the silane coupling agent layer 26 is provided, the silane coupling agent layer 26 is preferably between the Cu plating layer 31 and the Ni plating layer 32, for example.

The Ni plating layer 32 is able to prevent the base electrode layer 28 from being eroded by solder that mounts the multilayer ceramic capacitor 10. The Sn plating layer 33 is able to improve the wettability of solder that mounts the multilayer ceramic capacitor 10, facilitating mounting of the multilayer ceramic capacitor 10.

The Cu plating layer 31 preferably has an average thickness of about 5 μm or greater and about 8 μm or smaller, for example. The Ni plating layer 32 preferably has an average thickness of about 2 μm or greater and about 4 μm or smaller, for example. The Sn plating layer 33 preferably has an average thickness of about 2 μm or greater and about 4 μm or smaller, for example.

The first external electrodes 14a, the second external electrodes 14b, the third external electrodes 15a, and the fourth external electrodes 15b may each include the plating layer 30 and no base electrode layer 28. In this case, the plating layer 30 preferably includes, for example, the Cu plating layer 31, the Ni plating layer 32, and the Sn plating layer 33 sequentially from the laminate 12 side.

In the case where the laminate 12 is provided with the silane coupling agent layer 26, the silane coupling agent concentration on the mounting surface is preferably higher than the silane coupling agent concentration on the counter surface, for example.

Providing the silane coupling agent layer on the mounting surface of the laminate is able to reduce or prevent entry of moisture or flux into the laminate from the outside. Accordingly, corrosion caused by an organic acid included in the flux in flux mounting is able to be reduced or prevented, thus preventing a decrease in the moisture proof reliability.

The silane coupling agent concentration on the mounting surface being higher than the silane coupling agent concentration on the counter surface means that, for example, the silane coupling agent may be applied to only the mounting surface. This eliminates the need to apply the silane coupling agent to the entire surface of the laminate, thus providing selection of an application process without a load on the laminate (e.g., immersion, spray coating, ink jetting, spin coating after fixation of the laminate on a support).

The above features provide flux mounting, reducing the height of the multilayer ceramic capacitor and enhancing the thermal shock resistance.

The silane coupling agent layer includes, for example, a fluorine-based silane coupling agent or carbon-based silane coupling agent.

In particular, the silane coupling agent layer preferably includes a fluorine-based silane coupling agent, for example. As the silane coupling agent concentration on the mounting surface increases, the plating adhesion of the external electrodes decreases. Plating adhesion failure is able to be reduced or minimized by including the fluorine-based silane coupling agent.

In the case where the silane coupling agent layer includes a fluorine-based silane coupling agent, a silane coupling agent concentration A on the mounting surface and a silane coupling agent concentration B on the counter surface are calculated from the following formulas (1) and (2), respectively, according to the ratio between the concentration of F atoms derived from the silane coupling agent and the concentration of Ba atoms derived from the laminate.

$A=$(F atom concentration on mounting surface)/(Ba atom concentration on mounting surface) (1)

$B=$(F atom concentration on counter surface)/(Ba atom concentration on counter surface) (2)

In the case where the silane coupling agent layer includes a carbon-based silane coupling agent, the silane coupling agent concentration A on the mounting surface and the silane coupling agent concentration B on the counter surface are calculated from the following formulas (3) and (4), respectively, according to the ratio between the concentration of Si atoms derived from the silane coupling agent and the concentration of Ba atoms derived from the laminate.

$A=$(Si atom concentration on mounting surface)/(Ba atom concentration on mounting surface) (3)

$B=$(Si atom concentration on counter surface)/(Ba atom concentration on counter surface) (4)

Each of these atomic concentrations is able to be measured by X-ray photoelectron spectroscopy analysis (hereinafter, also referred to as XPS analysis).

The X-ray photoelectron spectrometer may be, for example, Quantum 2000 available from ULVAC-PHI, Inc. In this case, a region with a diameter of about 50 μm and an analytic depth of several nanometers is measured. The X-ray source is an AlKα ray. The survey scan is repeated 30 times with an energy range for the survey scan of about 0 eV or more and about 1200 eV or less.

Figure 8:
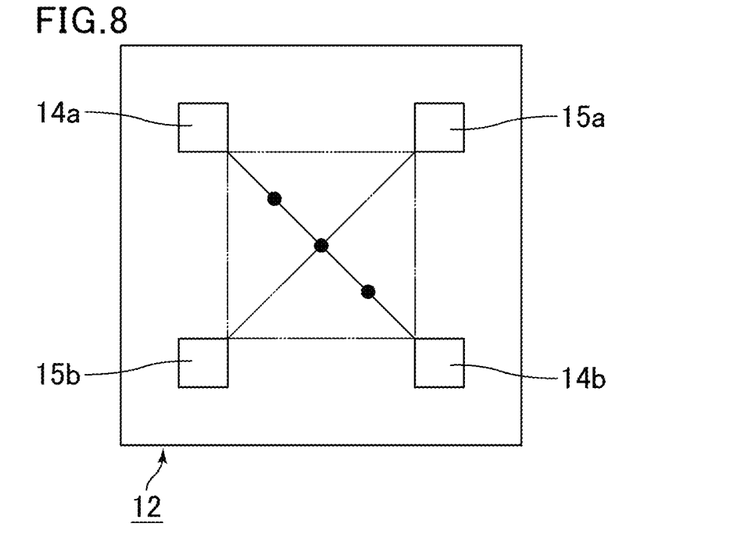
FIG. 8 is a plan view showing sites to be analyzed by XPS.

FIG. 8 is a plan view showing sites to be analyzed by XPS.

The following three points on the mounting surface and the counter surface are subjected to XPS analysis to calculate the average for each element ratio (each atomic ratio):

1. The centroid of a quadrangle surrounded by black dotted lines on the laminate 12 without the external electrodes 14a, 14b, 15a, and 15b.

2. Two points on one diagonal line, one at the midpoint between a vertex of the quadrangle and the centroid and the other at the midpoint between another vertex and the centroid.

The fluorine-based silane coupling agent in the silane coupling agent layer is preferably, for example, a silane coupling agent represented by:

$CF_3-(CF_2)_{n1}-R-Si(O-R')_3$ wherein n1 is an integer of 0 or greater, R is a substituent including Si or O or alkylene group, and R' is an alkyl group. For example, n1 may be an integer of 0 or greater and 7 or smaller. R' may be a methyl or ethyl group.

The silane coupling agent includes at least one alkoxy group, which is a reactive group. The silane coupling agent also includes at least one perfluoroalkyl group.

The fluorine-based silane coupling agent may be, for example, $CF_3(CF_2)_5(CH_2)_2Si(OCH_3)_3$, $CF_3(CF_2)_3(CH_2)_2Si(OCH_3)_3$, $CF_3(CF_2)_3(CH_2)_2Si(OC_2H_5)_3$, $CF_3(CF_2)_7(CH_2)_2Si(OCH_3)_3$, $CF_3CH_2O(CH_2)_{15}Si(OCH_3)_3$, $CF_3(CH_2)_2Si(CH_3)_2(CH_2)_{15}Si(OCH_3)_3$, $CF_3(CF_2)_3(CH_2)_2Si(CH_3)_2(CH_2)_9Si(OCH_3)_3$, $CF_3COO(CH_2)_{15}Si(OCH_3)_3$, $CF_3(CF_2)_5(CH_2)_2Si(OC_2H_5)_3$, $CF_3(CF_2)_7(CH_2)_2Si(CH_3)_2(CH_2)_9Si(OC_2H_5)_3$, $CF_3(CF_2)_7(CH_2)_2Si(CH_3)_2(CH_2)_6Si(OC_2H_5)_3$, $CF_3(CF_2)_7(CH_2)_2Si(OC_2H_5)_3$, $CF_3CH_2O(CH_2)_{15}Si(OC_2H_5)_3$, $CF_3COO(CH_2)_{15}Si(OC_2H_5)_3$, $CF_3(CF_2)_4CONH(CH_2)_3Si(OCH_3)_3$, $CF_3(CF_2)_7CONH(CH_2)_3Si(OCH_3)_3$, $CF_3(CF_2)_5CONH(CH_2)_3Si(OC_2H_5)_3$, or $CF_3(CF_2)_7CONH(CH_2)_3Si(OC_2H_5)_3$.

The carbon-based silane coupling agent in the silane coupling agent layer is preferably, for example, a silane coupling agent represented by:

$(RO)_3Si-(CH_2)_{n2}-CH_3$ wherein n2 is an integer of 0 or greater and 17 or smaller and R is a methyl or ethyl group.

The carbon-based silane coupling agent may be, for example, Shin-Etsu Chemical Co., Ltd.: KBM-3103C (decyltrimethoxysilane), KBM-13 (methyltrimethoxysilane), KBE-13 (methyltriethoxysilane), KBM-3033 (n-propyltrimethoxysilane), KBE-3033 (n-propyltriethoxysilane), KBM-3063 (hexyltrimethoxysilane), KBE-3063 (hexyltriethoxysilane); or Tokyo Chemical Industry Co., Ltd. (TCI): octadecyltrimethoxysilane.

The carbon-based silane coupling agent may also be any one of the following silane coupling agents: Shin-Etsu Chemical Co., Ltd.: KBM-103 (phenylmethoxysilane), KBM-3066 (1,6-bis(trimethoxysilyl)hexane), KBM-9659 (tris-(trimethoxysilylpropyl)isocyanurate).

The multilayer ceramic capacitors according to the preferred embodiments of the present invention each includes a structure that is able to be subjected to flux mounting as described above, and is also able to be subjected to conventional solder mounting.

Figure 9A:
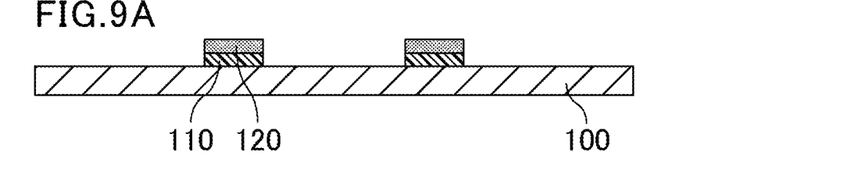
FIGS. 9A to 9C are views showing solder mounting.
Figure 9B:
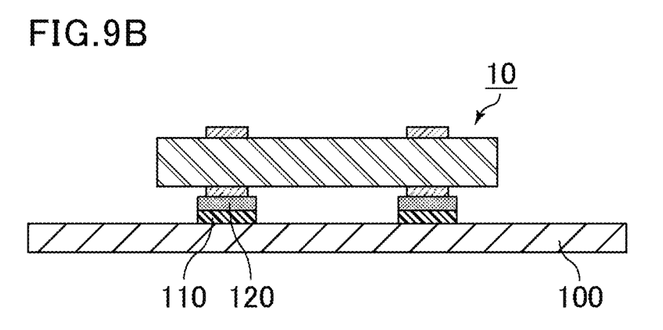
Figure 9C:
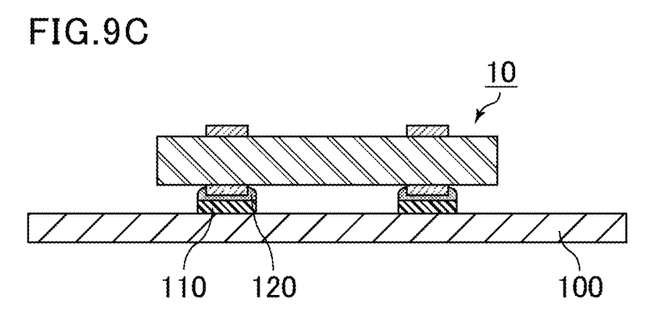

FIGS. 9A to 9C are views showing solder mounting.

In solder mounting, a solder paste 120 is applied to lands 110 on a substrate 100 as shown in FIG. 9A, followed by mounting of the multilayer ceramic capacitor 10 as shown in FIG. 9B. Then, the reflow process is performed as shown in FIG. 9C, and the electrical connection is provided between the substrate 100 and the multilayer ceramic capacitor 10.

Figure 10A:
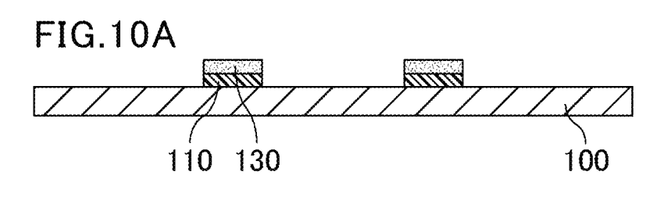
FIGS. 10A to 10C are views showing flux mounting.
Figure 10B:
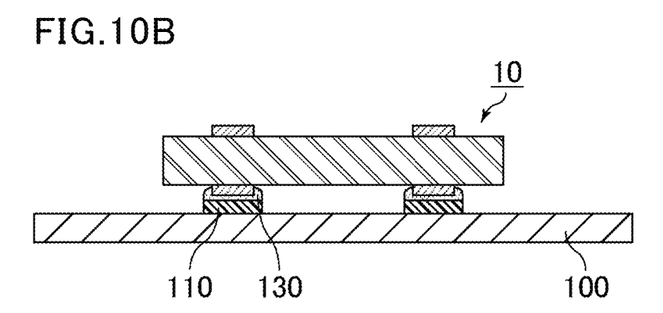
Figure 10C:
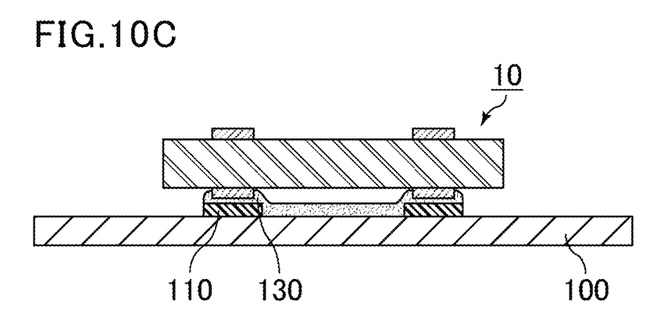

FIGS. 10A to 10C are views showing flux mounting.

In flux mounting, a thermosetting resin flux 130 is applied to the lands 110 on the substrate 100 as shown in FIG. 10A, followed by mounting of the multilayer ceramic capacitor 10 as shown in FIG. 10B. Then, the reflow process is performed as shown in FIG. 10C, and the melt of the external electrodes defining the multilayer ceramic capacitor 10 connects the lands 110 to the respective external electrodes, providing electrical connection between the substrate 100 and the multilayer ceramic capacitor 10.

Hereinafter, an example method of producing a multilayer ceramic capacitor according to a preferred embodiment of the present invention is described.

Figure 11:
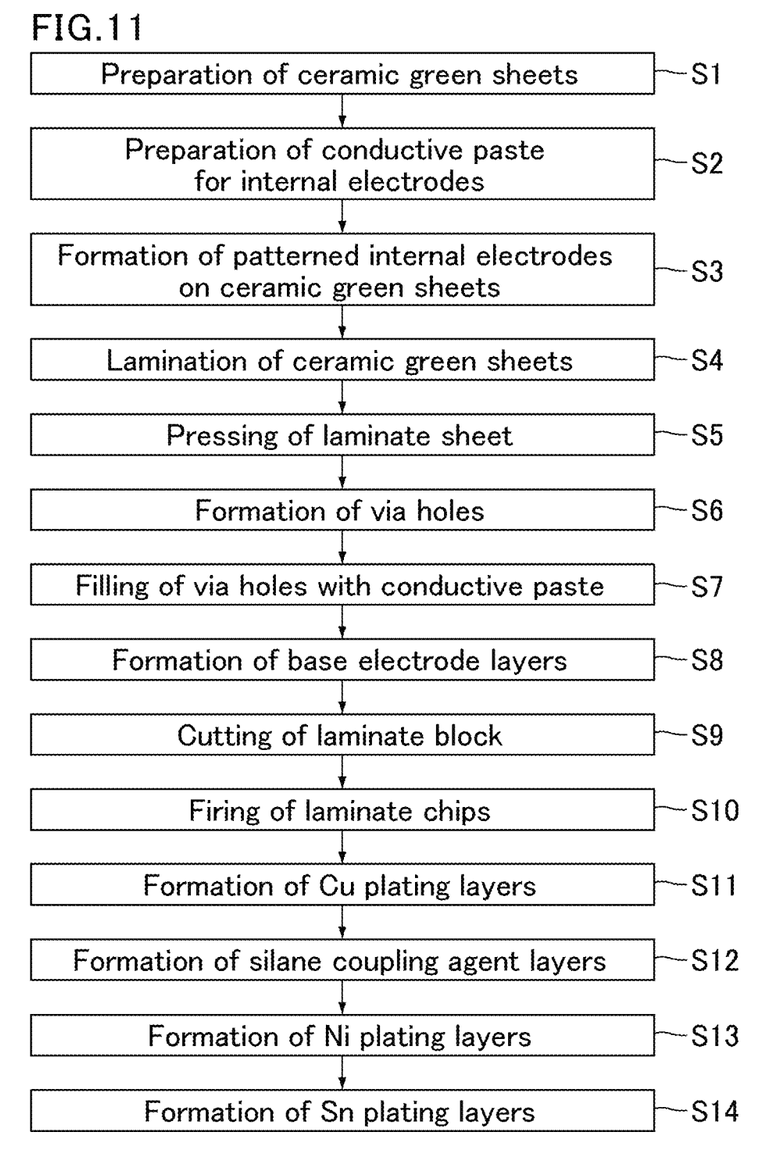
FIG. 11 is a flowchart showing an example method of producing a multilayer ceramic capacitor according to a preferred embodiment of the present invention.

FIG. 11 is a flowchart showing the example method of producing the multilayer ceramic capacitor according to a preferred embodiment of the present invention.

First, ceramic green sheets and a conductive paste for internal electrodes are prepared (steps S1, S2). The ceramic green sheets and the conductive paste for internal electrodes include a binder (e.g., known organic binder) and a solvent (e.g., organic solvent).

Next, the conductive paste is applied to each ceramic green sheet in a predetermined pattern by, for example, screen printing or gravure printing, to form patterned internal electrodes (step S3). Specifically, a paste including a conductive material is applied to the ceramic green sheet by screen printing or gravure printing to form a conductive paste layer. The paste including a conductive material is a paste provided by, for example, adding an organic binder and an organic solvent to metallic powder. Here, ceramic green sheets for outer layers without the patterned internal electrodes are also produced.

A laminate sheet is produced by alternately laminating ceramic green sheets with the patterned internal electrodes corresponding to the first internal electrode layers 18a and ceramic green sheets with the patterned internal electrodes corresponding to the second internal electrode layers 18b on a ceramic green sheet for an outer layer without the patterned internal electrodes, and laminating another ceramic green sheet for an outer layer without the patterned internal electrodes (step S4).

The produced laminate sheet is pressed in the lamination direction x by isostatic pressing or the like, and thus a laminate block is produced (step S5).

Via holes are formed in the laminate block (step S6). For example, four via holes are formed in the laminate block by laser processing. Here, a desmear process to remove smears (residues) in each of the via holes is preferably performed, for example.

Each of the via holes is then filled with a conductive paste, and raw via conductors 22a, 22b, 24a, and 24b are formed (step S7). The conductive paste to define the via conductors may be the same as or different from the conductive paste to define the patterned internal electrodes.

On the laminate block in which the via conductors are formed are formed raw base electrode layers 28 (step S8). Specifically, on each main surface of the laminate block, an external electrode paste including Ni as a main component is applied by roller transfer.

The laminate block is then cut into predetermined sized pieces to produce laminate chips (step S9). The corners and ridges of each of the laminate chips may be rounded by barrel polishing or the like. Each laminate chip corresponds to a raw laminate 12.

The laminate chips are fired to produce the laminates 12 (step S10). Although depending on the ceramic and the materials of the internal electrodes, the firing temperature is preferably, for example, about 900° C. or higher and about 1300° C. or lower. The conductive paste is baked in the firing to form the internal electrode layers 18a and 18b and the via conductors 22a, 22b, 24a, and 24b. The external electrode paste is also baked to form the base electrode layers 28.

Then, the Cu plating layers 31 are formed to cover the surfaces of the base electrode layers 28 (step S11).

In production of the multilayer ceramic capacitor 10A shown in FIG. 7, the silane coupling agent layers 26 are formed on the laminate 12 on which the layers up to the Cu plating layers 31 are formed (step S12).

First, a silane coupling agent solution is prepared. The silane coupling agent solution may be prepared by mixing a silane coupling agent and a solvent.

The silane coupling agent is, for example, any one of the fluorine-based silane coupling agents and the carbon-based silane coupling agents described above.

The solvent may be, for example, methanol, ethanol, or isopropanol.

The silane coupling agent concentration in the silane coupling agent solution may be, for example, about 0.1 vol % or higher and about 5 vol % or lower.

The silane coupling agent solution prepared as described above is applied to the laminate 12 on which layers up to the Cu plating layers 31 have been formed. The silane coupling agent solution may be applied to the laminate 12 by subjecting the laminate 12 fixed onto a support, for example, a foam release sheet, to immersion, coating, spin coating, or spraying. Here, the surface of the laminate 12 farther from the support is the mounting surface, and the surface closer to the support is the counter surface. The laminate 12 to which the silane coupling agent solution has been applied is heated, and thus the silane coupling agent layers 26 are formed on the laminate 12. The heating temperature may be about 60° C. or higher and about 150° C. or lower, for example. The heating time may be about 60 minutes or longer and about 120 minutes or shorter, for example.

Figure 12:
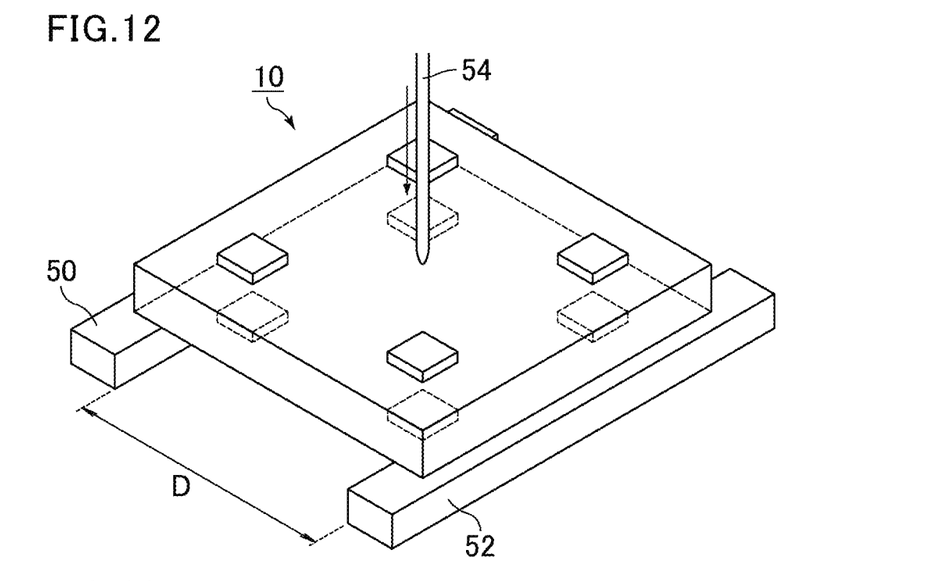
FIG. 12 is a perspective view showing a flexural strength test.

The formation of the silane coupling agent layers 26 is followed by formation of the Ni plating layers 32 (step S13). The Sn plating layers 33 are then formed on the surfaces of the Ni plating layers 32 (step S14). Thereby, the plating layers 30 each including the Cu plating layer 31, the Ni plating layer 32, and the Sn plating layer are formed. Accordingly, the first external electrode 14a, the second external electrode 14b, the third external electrode 15a, and the fourth external electrode 15b each including the base electrode layer 28 and the plating layer 30 are formed.

to a position corresponding to half the dimension in the width direction z and checking whether there is a crack. A sample with a crack was regarded as a defective product, and the number of defective products was counted. The number of samples evaluated in each of the examples and the comparative examples was 25. The numbers of samples with an internal structure defect are shown in Tables 1 and 2.

TABLE 1

| | Example | | | | | | | | | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| Dimension L (μm) | 550 | 600 | 650 | 700 | 750 | 630 | 650 | 700 | 750 | 600 | 600 | 600 |
| Dimension W (μm) | 550 | 600 | 650 | 700 | 750 | 570 | 550 | 600 | 650 | 600 | 600 | 600 |
| Dimension T (μm) | 90 | 90 | 90 | 90 | 90 | 90 | 90 | 90 | 90 | 90 | 90 | 90 |
| Dimension ratio W/L | 1.00 | 1.00 | 1.00 | 1.00 | 1.00 | 0.90 | 0.85 | 0.86 | 0.87 | 1.00 | 1.00 | 1.00 |
| Via conductor diameter (μm) | 60 | 60 | 60 | 60 | 60 | 60 | 60 | 60 | 60 | 30 | 150 | 60 |
| Distance G between external electrodes on first main surface (μm) | 100 | 100 | 100 | 100 | 100 | 100 | 100 | 100 | 100 | 100 | 100 | 80 |
| Number of samples with internal structure decect in flexural strength test | 0/25 | 0/25 | 0/25 | 0/25 | 0/25 | 0/25 | 0/25 | 0/25 | 0/25 | 0/25 | 0/25 | 0/25 |

Thus, as described above, the multilayer ceramic capacitor 10A shown in FIG. 7 is produced.

In production of the multilayer ceramic capacitor 10 shown in FIG. 1, step S12 may be omitted.

Step S8 in which the base electrode layers 28 are formed may be omitted. In this case, laminate chips without the base electrode layers 28 may be fired to produce the laminates 12, and the Cu plating layers 31 may be formed on each of the laminates 12.

In the preferred embodiment described above, the first via conductor and the second via conductor are connected to the first internal electrode layers and the third via conductor and the fourth via conductor are connected to the second internal electrode layers. However, the connection relationship between the via conductors and the internal electrode layers and the connection relationship between the internal electrode layers and the external electrodes are not limited to the preferred embodiment above. For example, the laminate may include the first internal electrode layers, the second internal electrode layers, the third internal electrode layers, and the fourth internal electrode layers. The first via conductor may be connected to the first internal electrode layers. The second via conductor may be connected to the second internal electrode layers. The third via conductor may be connected to the third internal electrode layers. The fourth via conductor may be fourth internal electrode layers.

Examples that further explain multilayer ceramic capacitors of the preferred embodiments of the present invention are described below. The present invention is not limited to these examples.

Multilayer ceramic capacitor samples having the structures shown in Table 1 were produced as examples. Also, multilayer ceramic capacitor samples having the structures shown in Table 2 were produced as comparative examples.

FIG. 12 is a perspective view showing a flexural strength test.

As shown in FIG. 12, the distance D between chip holders 50 and 52 was set to 400 μm, and the center of the main surface of each multilayer ceramic capacitor 10 sample was pushed with a push rod 54 having a diameter of 50 μm. The pressure was gradually increased to 1 N. Defects of the internal structure were checked by grinding the LT surface

TABLE 2

| | Comparative Example | | | |
|---|---|---|---|---|
| | 1-1 | 1-2 | 1-3 | 1-4 |
| Dimension L (μm) | 630 | 1050 | 750 | 800 |
| Dimension W (μm) | 270 | 450 | 550 | 600 |
| Dimension T (μm) | 90 | 90 | 90 | 90 |
| Dimension ratio W/L | 0.43 | 0.43 | 0.73 | 0.75 |
| Via conductor diameter (μm) | 60 | 60 | 60 | 60 |
| Distance G between external electrodes on first main surface (μm) | 100 | 100 | 100 | 100 |
| Number of samples with internal structure decect in flexural strength test | 3/25 | 2/25 | 2/25 | 3/25 |

According to Table 1, the flexural strength test found no internal structure defect in Example 1-1 to Example 1-5 in each of which the shape of the multilayer ceramic capacitor as viewed in the lamination direction x was square and the dimension L in the length direction y and the dimension W in the width direction z of the multilayer ceramic capacitor were varied to provide a ratio W/L of 1.00 and a dimension L of 750 μm or smaller.

Also, the flexural strength test found no internal structure defect in Example 1-6 to Example 1-9 in each of which the shape of the multilayer ceramic capacitor as viewed in the lamination direction x was rectangular and the dimension L in the length direction y and the dimension W in the width direction z of the multilayer ceramic capacitor were varied to provide a ratio W/L of 0.85 or more and less than 1 and a dimension L of 750 μm or smaller.

In Example 1-10 and Example 1-11, the samples had via conductor diameters of 30 μm and 150 μm, respectively, with a ratio W/L of 1 and a dimension L of 600 μm. The samples were evaluated by the same method as above, and no internal structure defect was found.

In Example 1-12, the distance between adjacent external electrodes on the first main surface was set to 80 μm. The evaluation found no internal structure defect as in the above examples.

In contrast, according to Table 2, the flexural strength test found three defective products in Comparative Example 1-1 in which the ratio W/L was 0.43, which is not a value of 0.85 or more and 1 or less. Also, in Comparative Example 1-2 in which the W/L was 0.43, which is not a value of 0.85 or more and 1 or less, the flexural strength test found two defective products.

In Comparative Example 1-3 in which the ratio W/L was 0.73, which is not a value of 0.85 or more and 1 or less, the flexural strength test found two defective products.

In Comparative Example 1-4 in which the ratio W/L was 0.75, which is not a value of 0.85 or more and 1 or less, and the dimension L was 800 μm, which is not a value of 750 μm or smaller, the flexural strength test found three defective products.

The results above confirmed that the flexural strength increases when the dimension L in the length direction y and the dimension W in the width direction z of the multilayer ceramic capacitor satisfy the ranges of 0.85≤W/L≤1 and L≤750. In other words, the flexural strength is able to increase as the shape as viewed in the lamination direction x of the multilayer ceramic capacitor becomes more square. Similar results were provided when the dimension T in the lamination direction x falls within the range of 50 μm≤T≤110 μm.

Multilayer ceramic capacitors having a distance G between adjacent external electrodes on the first main surface of the laminate of 180 μm, 100 μm, and 80 μm were evaluated for a short circuit between external electrodes due to migration. Specifically, each multilayer ceramic capacitor was mounted on a substrate by flux mounting and driven with a voltage of 3.2 V or lower for 72 hours at a temperature of 125° C. and a humidity of 95% to evaluate for a short circuit between external electrodes due to migration. The number of samples evaluated in each of the examples was 18. Table 3 shows the results.

TABLE 3

|  | Example | | |
| --- | --- | --- | --- |
|  | 2-1 | 2-2 | 2-3 |
| Dimension L (μm) | 600 | 600 | 600 |
| Dimension W (μm) | 600 | 600 | 600 |
| Via conductor diameter (μm) | 60 | 60 | 60 |
| Distance G between external electrodes on first main surface (μm) | 180 | 100 | 80 |
| Number of samples with migration | 0/18 | 0/18 | 2/18 |

According to Table 3, the multilayer ceramic capacitor samples of Example 2-1 and Example 2-2 having a distance G between adjacent external electrodes on the first main surface of 100 μm or longer caused no short circuit due to migration when mounted on the substrate. In contrast, two multilayer ceramic capacitor samples of Example 2-3 having a distance G between adjacent external electrodes on the first main surface of less than 100 μm out of 18 multilayer ceramic capacitor samples caused a short circuit due to migration when mounted on the substrate.

Multilayer ceramic capacitors with different flatnesses of the mounting surface of the laminate were subjected to solder mounting and flux mounting to compare the land-capacitor electrical connections. The number of multilayer ceramic capacitor samples provided for each evaluation was 100. The electrical connection was tested by capacitance measurement. Table 4 shows the results.

TABLE 4

| Example | Mounting method | Average flatness (n = 100) | Connection failure (X/100) | Evaluation |
| --- | --- | --- | --- | --- |
| 3-1 | Solder | 82 | 0 | Excellent |
| 3-2 |  | 75 | 0 | Excellent |
| 3-3 |  | 63 | 0 | Excellent |
| 3-4 |  | 29 | 0 | Excellent |
| 3-5 |  | 18 | 0 | Excellent |
| 3-6 | Flux | 86 | 0 | Excellent |
| 3-7 |  | 63 | 0 | Excellent |
| 3-8 |  | 31 | 0 | Excellent |
| 3-9 |  | 24 | 1 | Good |
| 3-10 |  | 15 | 2 | Good |

In the case of solder mounting, all the flatnesses provided capacitance measurement, meaning that no connection failure was detected. In contrast, in the case of flux mounting, connection failure was detected when the flatness was lower than 31. These results show that with a flatness of the mounting surface of the laminate of 31 or higher, flux mounting is able to be performed.

Multilayer ceramic capacitors having a dimension L of 600 μm, a dimension W of 600 μm, a dimension T of 90 μm, a via conductor diameter of 60 μm were subjected to solder mounting and flux mounting to compare the thermal shock resistances. The number of multilayer ceramic capacitor samples provided for each evaluation was 30. Each sample mounted on a four-layer substrate by one of the mounting methods was subjected to the thermal shock resistance test within a temperature range of −55° C. to 125° C. for 100 cycles. Defects of the internal structure were checked by grinding the LT surface to a position corresponding to half the dimension in the width direction of the laminate and checking whether there is a crack. In the case of solder mounting, a crack was detected in two samples out of 30 samples. In contrast, in the case of flux mounting, a crack was detected in none of 30 samples. These results show that flux mounting leads to a higher thermal shock resistance than solder mounting.

The multilayer ceramic capacitors of the examples and comparative examples were subjected to solder mounting and flux mounting to confirm the mounting thickness reduction effect provided by the external electrode structure and flux mounting. The multilayer ceramic capacitor samples evaluated had a dimension T of 50 μm with which the capacitor strength is especially problematic.

Multilayer ceramic capacitors having a dimension L of 600 μm, a dimension W of 600 μm, and a via conductor diameter of 60 μm and including external electrodes as shown in FIG. 1 (hereinafter, the structure is referred to as a via electrode structure) were produced as the multilayer ceramic capacitors of the examples.

Figure 13:
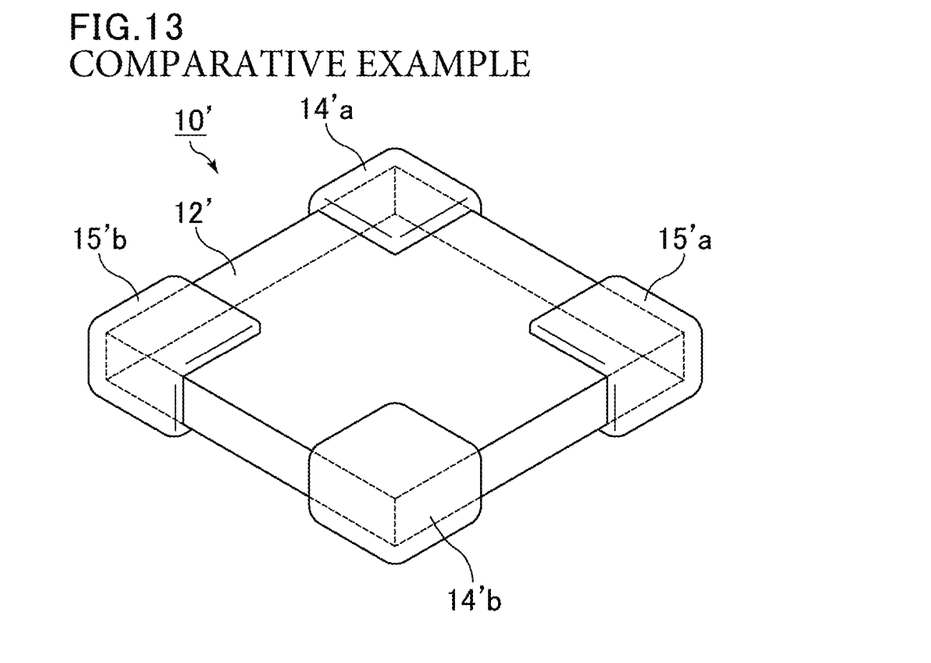
FIG. 13 is a perspective view showing a multilayer ceramic capacitor of a comparative example.

FIG. 13 is a perspective view showing a multilayer ceramic capacitor of a comparative example.

Multilayer ceramic capacitors having a dimension L of 600 μm and a dimension W of 600 μm, and including external electrodes as shown in FIG. 13 (hereinafter, the structure is referred to as a U-shaped electrode structure) were produced as the multilayer ceramic capacitors of the comparative examples. A multilayer ceramic capacitor 10' shown in FIG. 13 includes a first external electrode 14'a, a second external electrode 14'b, a third external electrode 15'a, and a fourth external electrode 15'b, each having a U shape, at the four corners of a laminate 12' which is a rectangular cuboid.

The mounting thickness was measured by grinding the LT surface to a position corresponding to half the dimension in the width direction and observing the cross section. In the case of solder mounting, the via electrode structure was found to reduce the mounting thickness by about 11% as compared to the U-shaped electrode structure. Also, the via electrode structure in the case of flux mounting was found to reduce the mounting thickness by about 20% as compared to the via electrode structure in the case of solder mounting. These results show that even with a dimension T of about 50 μm, the mounting thickness is able to be reduced by including external electrodes with the via electrode structure and by mounting the capacitor by flux mounting. The thickness of the capacitor is able to be increased by the amount corresponding to the reduced mounting thickness, and the flexural strength is able to be increased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mounting structure of a multilayer ceramic capacitor comprising:
   a substrate; and
   a multilayer ceramic capacitor connected to the substrate via a bonding material; wherein
   the multilayer ceramic capacitor includes:
      a laminate including a plurality of dielectric layers and a plurality of internal electrode layers laminated together, the laminate including a first main surface and a second main surface that oppose each other in a lamination direction, a first side surface and a second side surface that oppose each other in a length direction perpendicular or substantially perpendicular to the lamination direction, and a third side surface and a fourth side surface that oppose each other in a width direction perpendicular or substantially perpendicular to the lamination direction and the length direction; and
      external electrodes that are on the main surfaces of the laminate and electrically connected to the internal electrode layers;
   the laminate further includes a first via conductor, a second via conductor, a third via conductor, and a fourth via conductor that connect the internal electrode layers and the external electrodes, each of the via conductors penetrating the laminate in the lamination direction and including a first end surface exposed on the first main surface of the laminate and a second end surface exposed on the second main surface of the laminate;
   the external electrodes include a pair of first external electrodes connected to the respective end surfaces of the first via conductor, a pair of second external electrodes connected to the respective end surfaces of the second via conductor, a pair of third external electrodes connected to the respective end surfaces of the third via conductor, and a pair of fourth external electrodes connected to the respective end surfaces of the fourth via conductor, each of the external electrodes not extending to the side surfaces of the laminate; and
   a ratio W/L of a dimension W in the width direction of the multilayer ceramic capacitor to a dimension L in the length direction of the multilayer ceramic capacitor being about 0.85 or more and about 1 or less.

2. The mounting structure according to claim 1, wherein the bonding material is solder.

3. The mounting structure according to claim 1, wherein the bonding material is flux.

4. The mounting structure according to claim 1, wherein a dimension T in the lamination direction of the multilayer ceramic capacitor is about 50 μm or greater and about 110 μm or smaller.

5. The mounting structure according to claim 1, wherein a flatness of a mounting surface of the laminate, determined as a proportion of a total area of regions of the external electrodes within about 5 μm from a highest point on all of the external electrodes to a total area of the external electrodes, is about 31 or more.

6. The mounting structure according to claim 5, wherein the flatness is less than about 100.

7. The mounting structure according to claim 1, wherein a distance between adjacent external electrodes on the first main surface of the laminate is about 100 μm or greater.

8. The mounting structure according to claim 7, wherein the distance between adjacent external electrodes on the first main surface of the laminate is less than about 600 μm.

9. The mounting structure according to claim 1, wherein a diameter of each of the via conductors is about 30 μm or greater and about 150 μm or smaller.

10. The mounting structure according to claim 1, wherein:
    the first main surface of the laminate is a mounting surface and the second main surface is a counter surface; and
    a silane coupling agent layer is on at least the mounting surface among the surfaces of the laminate.

11. The mounting structure according to claim 10, wherein a silane coupling agent concentration on the mounting surface is higher than a silane coupling agent concentration on the counter surface.

12. The mounting structure according to claim 10, wherein the silane coupling agent layer includes a fluorine-based silane coupling agent.

* * * * *